United States Patent
Arthur et al.

(10) Patent No.: US 9,167,593 B2
(45) Date of Patent: Oct. 20, 2015

(54) CELL MONITOR SYSTEM FOR 4G CELLULAR NETWORKS

(75) Inventors: Colin M Arthur, Edinburgh (GB); Francisco Javier Garcia, Fife (GB); Gery Verhaegen, Vlaams Brabant (BE); Joeri Melis, Herent (BE)

(73) Assignee: Keysight Technologies, Inc., Santa Rosa, CA (US)

( * ) Notice: Subject to any disclaimer, the term of this patent is extended or adjusted under 35 U.S.C. 154(b) by 174 days.

(21) Appl. No.: 13/433,173

(22) Filed: Mar. 28, 2012

(65) Prior Publication Data
US 2013/0260773 A1    Oct. 3, 2013

(51) Int. Cl.
*H04W 72/12* (2009.01)
(52) U.S. Cl.
CPC ................................. *H04W 72/12* (2013.01)
(58) Field of Classification Search
CPC combination set(s) only.
See application file for complete search history.

(56) References Cited

U.S. PATENT DOCUMENTS

| | | | |
|---|---|---|---|
| 2010/0008294 A1* | 1/2010 | Palanki et al. | 370/328 |
| 2010/0067426 A1* | 3/2010 | Voschina et al. | 370/313 |
| 2011/0244857 A1* | 10/2011 | Hsieh et al. | 455/435.1 |
| 2011/0294497 A1 | 12/2011 | Hedlund et al. | |
| 2012/0066724 A1* | 3/2012 | Zussman | 725/65 |
| 2012/0188976 A1* | 7/2012 | Kim et al. | 370/329 |

* cited by examiner

*Primary Examiner* — Ian N Moore
*Assistant Examiner* — Eric H Wang

(57) ABSTRACT

An apparatus that includes a base-band input port and a processor and a method for operating the same are disclosed. The base-band input port receives digital base-band communications including a plurality of communication channels utilized in communications between an RF module and a plurality of user equipment (UE) in a cell serviced by that RF module. The processor demodulates specific channels in the digital base-band communications and extracts therefrom information specifying a unique identity for each of the UEs and a temporary identification used for communicating with that UE. The processor also extracts scheduling information identifying when one of the UEs is scheduled to upload information to the RF module and the communication channels over which the information is to be uploaded. The processor does not demodulate others of the communication channels.

9 Claims, 3 Drawing Sheets

CELL MONITOR SYSTEM FOR 4G CELLULAR NETWORKS

BACKGROUND

Surveillance and monitoring systems for intercepting communications between transmitters in cellular telephone systems are used by law enforcement and operational support system providers to monitor the traffic and sometimes the content of the communications on such transmitters, referred to as user equipment (UE) in the following discussion.

Monitoring systems for communications in earlier cellular systems tapped a point in the data flow that is no longer available in 4G networks. In addition, the data that is available is in the form of base-band carrier data that encodes the entire set of transmissions between the cellular transmitter and all of the UE in a cell. The cost of a monitoring system that decodes all of the data is a significant barrier to the implementation of such systems. In addition, the monitoring station capabilities would depend on the location of the monitor in the particular cell, since not all UE may be visible at a particular location within the cell.

SUMMARY

Embodiments of the present invention include an apparatus that includes a base-band input port and a processor. The base-band input port receives digital base-band communications that include a plurality of communication channels utilized in communications between an RF module and a plurality of UEs in a cell serviced by that RF module. The processor demodulates specific channels in the digital base-band communications and extracts therefrom information specifying a unique identity for each of the UEs and a temporary identification used for communicating with that UE. The processor also extracts scheduling information identifying when one of the UEs is scheduled to upload information to the RF module and the communication channels over which the information is to be uploaded. The processor does not demodulate others of the communication channels.

In one aspect of an embodiment of the present invention scheduling information identifying when one of the UEs is scheduled to download information is also extracted. In one aspect of these embodiments, the processor demodulates information transmitted by one of the UEs without demodulating information transmitted by another of the UEs. The demodulated information is determined from the scheduling information.

In another aspect of an embodiment of the present invention, the processor demodulates information that is to be sent to one of the UEs without demodulating information that is sent to another of the UEs.

In yet another aspect of an embodiment of the present invention, the RF module is part of an LTE cellular communication system and the scheduling information is obtained on a Physical Downlink Control Channel of the LTE cellular communication system.

In a still further aspect of an embodiment of the present invention, the unique identity of a UE is obtained by decoding information on channels used by a UE to sign onto the cellular communication system.

In another aspect of an embodiment of the present invention, the RF module is connected to a base station main unit that transmits and receives the digital base-band communications by a digital transmission link and the apparatus of the present invention further includes a passive splitter that intercepts traffic on the digital transmission link.

In a still further aspect of an embodiment of the present invention, the base station main unit services a plurality of RF modules on the digital transmission link and the apparatus of the present invention further determines an RF module associated with each communication on the digital transmission link.

DETAILED DESCRIPTION

In a 4G cellular network, the communications between the network interface to a cell and the UE are separated into a base-band digital processing function and the actual RF functions of the antenna system such as filtering, modulation of the carrier for the cell in question, frequency conversion and amplification. These functions are separated into two modules, a Radio Equipment Control (REC) module that performs the digital processing function and a Radio Equipment (RE) module that provides the RF functions and interfaces to the UEs through the cell antennae. An RE module is located in each cell. The RE module is connected by high-speed point-to-point serial links to the REC module. The REC module and RE module exchange data in the form of digital in-phase and quadrature (IQ) base-band data. The RE module up-converts the outgoing data and transmits that data on a band of frequencies assigned to the cell in question. The RE module takes RF signals from the various UEs, down-converts those RF signals to base-band and digitizes the base-band data for transmission to the REC module. In addition, control data are multiplexed onto the high-speed digital bus in the form of packets or frames. Two standards have been proposed for the communications between the REC modules and the RE modules. These are commonly referred to as the Common Public Radio Interface (CPRI) and the Open Base Station Architecture Initiative (OBSAI).

In the present invention, a cell monitor function is implemented by inserting an IQIM into the digital link between the REC module and the RE module using a passive splitter. The IQIM has access to all of the base-band data, and hence, can monitor the communications to and from any UE being serviced by the RF transmitter in the cell without requiring down conversion of the RF signals. In addition, the present invention takes advantage of the known protocols for data exchanges between the UE and REC modules, and hence, the present invention can selectively demodulate and decode the base-band to access the data for a UE of interest while reducing the computational workload by not demodulating and decoding data for other UEs that are not of interest to the monitoring system.

The base-band data specifies transmissions on each of a number of sub-carriers in a broad RF frequency band that is used by RE module to communicate with UEs. Some of the sub-carriers are used to create fixed channels that carry scheduling information and other information that specifies how the remainder of the sub-carriers are to be used at any particular time. The present invention decodes selected ones of the fixed channels to determine which of the remaining sub-carriers is being used by a UE of interest. These sub-carriers are then selectively demodulated and decoded to provide the data of interest. The base-band data for the remaining sub-carriers can be ignored to reduce the computational workload on the processor in the IQIM.

Figure 1:
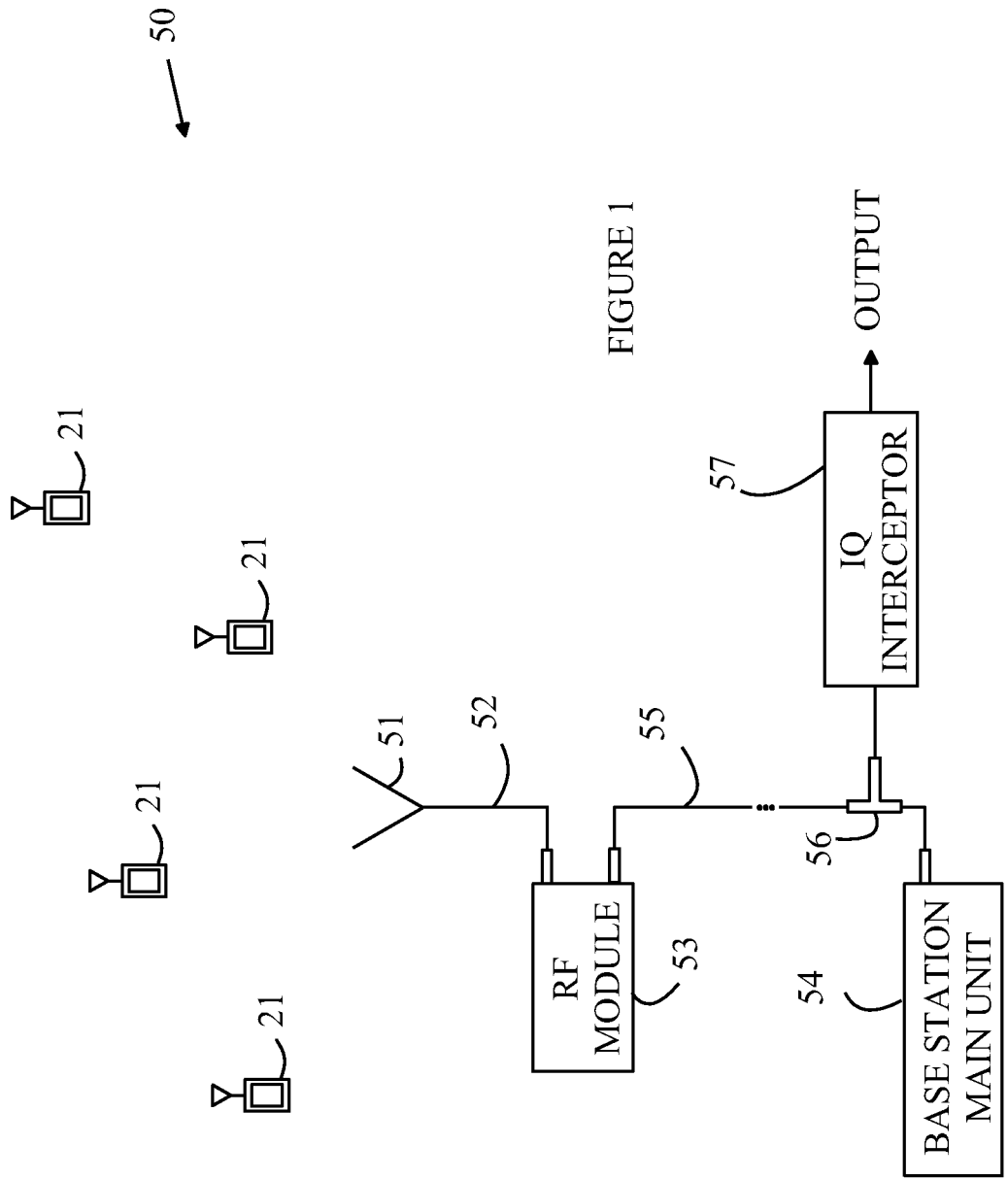
FIG. 1 illustrates the manner in which an IQ Interceptor module (IQIM) according to the present invention is inserted into the communication link between an RF module and an REC module.

Refer now to FIG. 1, which illustrates the manner in which an IQIM 57 according to the present invention is inserted into the communication link between an RF module and an REC module. In cell 50, the function of the traditional transmission node between the cellular system and UE 21 is provided by antenna 51, RF module 53, and base station main unit 54. RF module 53 is connected to antenna 51 via an RF link 52. RF module 53 is connected to base station main unit 54 by digital link 55. RF module 53 provides the functions of the RE module discussed above, and base station main unit 54 provides the functions of the REC module discussed above. A passive splitter 56 is introduced into digital link 55.

Passive splitter 56 will in general be of a type that depends on the nature of digital link 55. For example, if digital link 55 is an optical link, an optical splitter is preferred. Such optical or electrical splitting is common practice in modern networks, and hence, will not be discussed in detail here.

The manner in which a monitoring system according to the present invention operates can be more easily understood with respect to LTE cellular networks. Such networks are part of the evolving 4G networks; however, embodiments based on other network standards such as Mobile WiMAX can also be constructed.

In LTE networks, the transmission of any radio traffic within a cell is strictly controlled by a node, referred to as the eNode-B, in each cell. The eNode-B is implemented as an RF module and a base station main unit as discussed above. Transmissions between the eNode-B and the UEs in the cell are sent in the form of frames.

Figure 2:
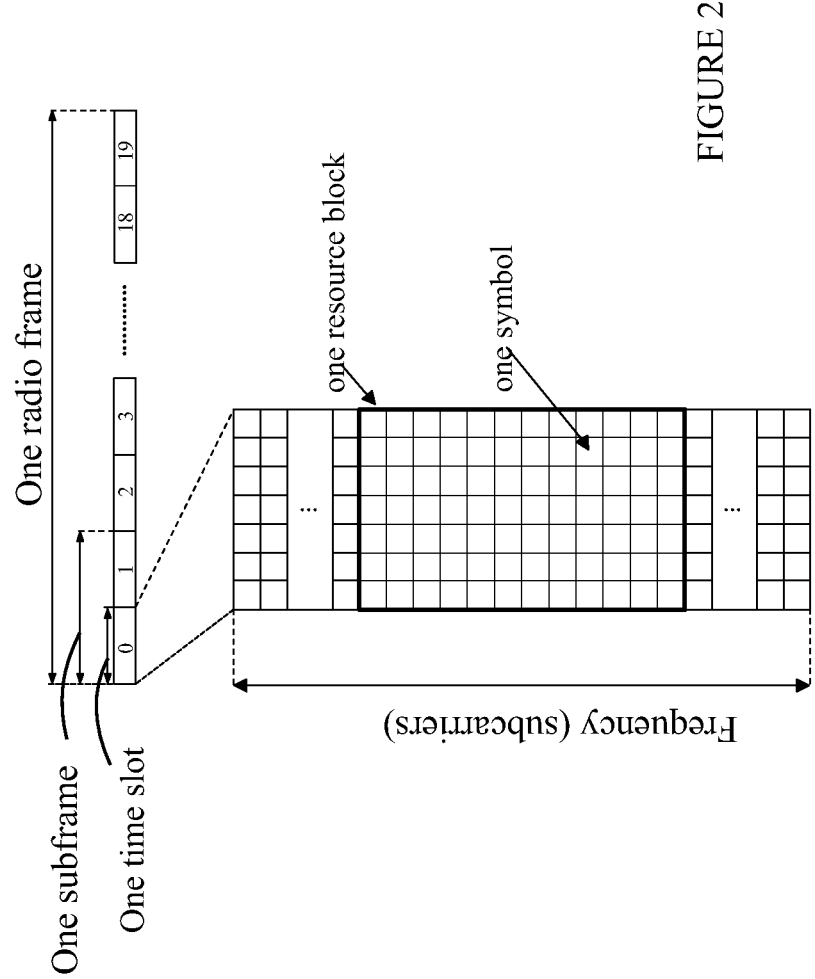
FIG. 2 illustrates the organization of the transmissions in an LTE network.

Refer now to FIG. 2, which illustrates the organization of the transmissions in an LTE network. Each frame includes ten sub-frames, and each sub-frame includes two time slots. Each time slot is divided into a plurality of symbol transmission periods. The frequency band assigned to the cell is likewise divided into a plurality of resource blocks (RBs) with each RB being further divided into a plurality of sub-carriers. An RB can be viewed as a band of sub-carriers that is typically 12 sub-carriers wide in frequency and extends in time for one slot. During each transmission either to or from the eNode-B, the transmitter sends a plurality of symbols on each sub-carrier.

The number of symbols in each slot, the number of RBs, and the number of sub-carriers in each RB vary depending on the specific LTE network implementation. In general, in an LTE network, a UE will be assigned one or more RBs and one or more time slots. For the purposes of this discussion, it is sufficient to note that the RBs are assigned to a UE on a subframe-by-subframe basis. The UE transmits a predetermined number of symbols on each sub-carrier assigned to it during the corresponding time slot in the frame.

Similarly, when data is to be sent to a UE, the eNode-B informs the UE of the RBs in an upcoming frame from the eNode-B that are intended for that UE. The UE then decodes those RBs in the indicated frame.

Hence, to monitor the transmissions to and from a particular UE, an IQIM according to the present invention must be able to identify which RBs in each frame are assigned to that UE for reception or transmission. These assignments change on a subframe-by-subframe basis and are provided on certain fixed channels that are implemented in the frames. Given this scheduling information, the RBs can be recovered from the frames, which are coded in the digital base-band data on digital link 55 discussed above.

It should also be noted that once the RBs to be decoded are identified, those RBs can be decoded from the base-band data for a particular frame without decoding the entire frame. Hence, the computational resources needed in an IQIM can be substantially reduced compared to those needed to decode the entire transmissions sent by or received by the eNode-B.

As noted above, the eNode-B is responsible for all scheduling decisions, for both downlink and uplink traffic, and communicates these scheduling decisions to all UEs in the cell using a channel referred to as the Physical Downlink Control Channel (PDCCH). The eNode-B assigns Radio Network Temporary Identifier (RNTI) addresses to each UE within the cell, and when it wishes to schedule a transmission on downlink or uplink for a particular UE, it sends a scheduling message on the PDCCH addressed to that UE's RNTI.

For radio transmissions sent on the uplink (UE to eNode-B), the eNode-B sends "Downlink Control Information Format 0" (DCI0) messages on the PDCCH, to instruct the UE when and where it should transmit. These DCI0 messages indicate which RBs the UE should use in a specified future frame. For example, the message could specify that the UE is assigned a particular group of RBs in the subframe that is four subframes from the current subframe. Hence, these messages allow the present invention to build a table of which RBs correspond to uplink data that will be sent by a UE of interest in a future frame. The present invention can then demodulate and decode the uplink transmissions in question from the IQ data intercepted on digital link 55 to provide monitoring of data from that UE.

The above-described embodiments utilize RNTI numbers for each of the mobile units. However, the monitoring system needs to monitor traffic for a specific UE. Each UE has a permanent identifier (IMSI number). Hence, some method for providing the correspondence between the RNTIs used in a particular cell and the IMSIs of the UE is needed. The assignment of RNTI numbers to a UE is made during a registration process that occurs when a UE enters the cell. There is a signing protocol that consists of a number of messages between the UE and the eNode-B. In this exchange, the UE identifies itself by its IMSI and receives an RNTI. The IQIM monitors the relevant channels on which this dialog takes place and records the RNTI assigned to each IMSI in a mapping table that is used to determine which RNTI traffic is to be monitored.

To simplify the following discussion, it will be assumed that the communications on digital link 55 utilize the CPRI protocol in an LTE cellular network. However, analogous procedures can be utilized in other standards. CPRI data is sent in frames. Each LTE frame is 10 ms long, which is identical to the size of the CPRI base frame. Each 10 ms frame is broken into 150 hyper-frames that are each broken into 256 basic frames. The length of each basic frame is 260.4 ns. Each basic frame is made up of 16 words. The size of each word in bytes depends on the specific data link rate that is implemented on the digital line. The word size varies from 1 to 4 bytes depending on the specific data link rate.

The IQ data in a frame appears at a predetermined position in the frame, and hence, can easily be extracted from the frame. The IQ data is the base-band signal for one time slot in the transmission or reception of one radio frame as described above. The IQ data specifies a multi-carrier signal in which one set of symbols is transmitted on each sub-carrier. The data of interest to the IQIM is confined to a sub-set of the sub-carriers. Hence, only the IQ data related to those sub-carriers needs to be demodulated to recover the required information.

As noted above, the data corresponding to any sub-carrier can be demodulated separately using an appropriate filter.

Each 10 ms LTE RF frame is made up of ten sub-frames of 1 ms duration. Each sub-frame is made up of two 0.5 ms slots, which consist of six or seven symbols depending on the specific protocol. Hence, there are 20 slots in a single 10 ms LTE RF frame. The base-band frequency band is divided into a number of sub-carriers that are grouped together into RBs. An RB may span 12 or 24 sub-carriers depending on the service being provided, e.g., data or voice. The smallest scheduling unit allocated by the base station is a pair of RBs.

There are four downlink physical channels of interest that can be monitored by filtering the IQ data. The first channel of interest is the Physical Broadcast Control Channel (PBCH) that carries cell specific information such as system bandwidth, number of transmit antennas, frame number and the size of the channel. This data is used to support the Hybrid Automatic Repeat Request (HARD) processes that provide resilience against loss of data or unrecoverable data at the air interface. This channel is present in the first sub-frame of each RF frame. It is located in the six RBs allocated over the center frequency, occupying the first four symbols in the second slot. The channel is modulated using Quadrature Phase Shift Keyed (QPSK).

The second channel of interest is the Physical Control Format Indicator Channel (PCFICH) that carries information on how many symbols are used in every sub-frame for another two physical control channels, in particular the PDCCH described below. Depending on configurations 1, 2 or 3, symbols across all sub-carriers are used for the purpose of these control channels. The PCFICH occupies the first symbol of slot 0 in every sub-frame and is modulated using QPSK.

The third channel of interest is the PDCCH. This channel is used in the present invention to minimize the amount of data collected by the IQIM. This channel is used by the base station to schedule both downlink and uplink transmissions and thus may be present in every downlink sub-frame. The number of symbols used across all sub-carriers is signaled by the PCFICH above. Each schedule represents a message describing the scheduling assignments and other control information for a particular mobile device. This channel carries the DCI messages discussed above. The modulation scheme used for the PDCCH is QPSK.

The fourth channel is the Physical Downlink Shared Channel (PDSCH) that carries user data, paging data and specific signaling control data between the base station and mobile terminal. The manner in which this channel is filtered to achieve data reduction will be discussed in more detail below. This data tends to be transmitted on sub-carriers and symbols not used by other downlink channels and the schedules for this data are signaled in the PDCCH. The modulations schemes used for RF bursts in this channel may be one of QPSK, 16 QAM or 64 QAM. The actual modulation scheme used per burst is signaled in the associated schedule transmitted in the PDCCH.

Additionally, the Physical Uplink Shared Channel (PUSCH) is also decoded. This channel is used in the data exchange that provides the correspondence between the RNTIs and the subscriber's unique identification number.

The precise details of these channels and methods for utilizing a DSP to demodulate and error decode these channels are provided in the LTE specifications, and hence, will not be discussed in detail here.

As noted above, each scheduling message describes when (in terms of symbols) and where (in terms of frequency) the UE should find its data in the downlink and where it should transmit in the uplink. Signaled downlink transmissions are always located on the same sub-frame as the downlink schedule. Uplink transmissions are signaled by DCI0 messages discussed above.

As noted above, scheduling is performed using RNTI identifiers for the UE. To provide the monitoring of a particular UE in the cell, the IQIM must determine the correspondence between a unique identification number assigned to the UE of interest and the RNTI used for that UE in the cell. The RNTI is assigned to the UE when the UE enters the cell and requests service in a series of communications on the PDSCH and the PUSCH. The UE first uses a Shared Physical Random Access Cannel (PRACH) to transmit a preamble indicating that it wants to join the network. If the request is successful, the eNodeB sends back a Random Access Response message which contains configuration parameters, in particular the initial Timing Advance, the Temporary C-RNTI and an uplink grant indicating where in time and frequency the UE should send its connection request message. If the process is successful, the eNodeB responds with a contention resolution message. The temporary C-RNTI becomes the UE's RNTI and, more importantly, the message from the UE to the eNodeB contains the UE's unique identification in the form of the Subscribers TMSI (s-TMSI).

Figure 3:
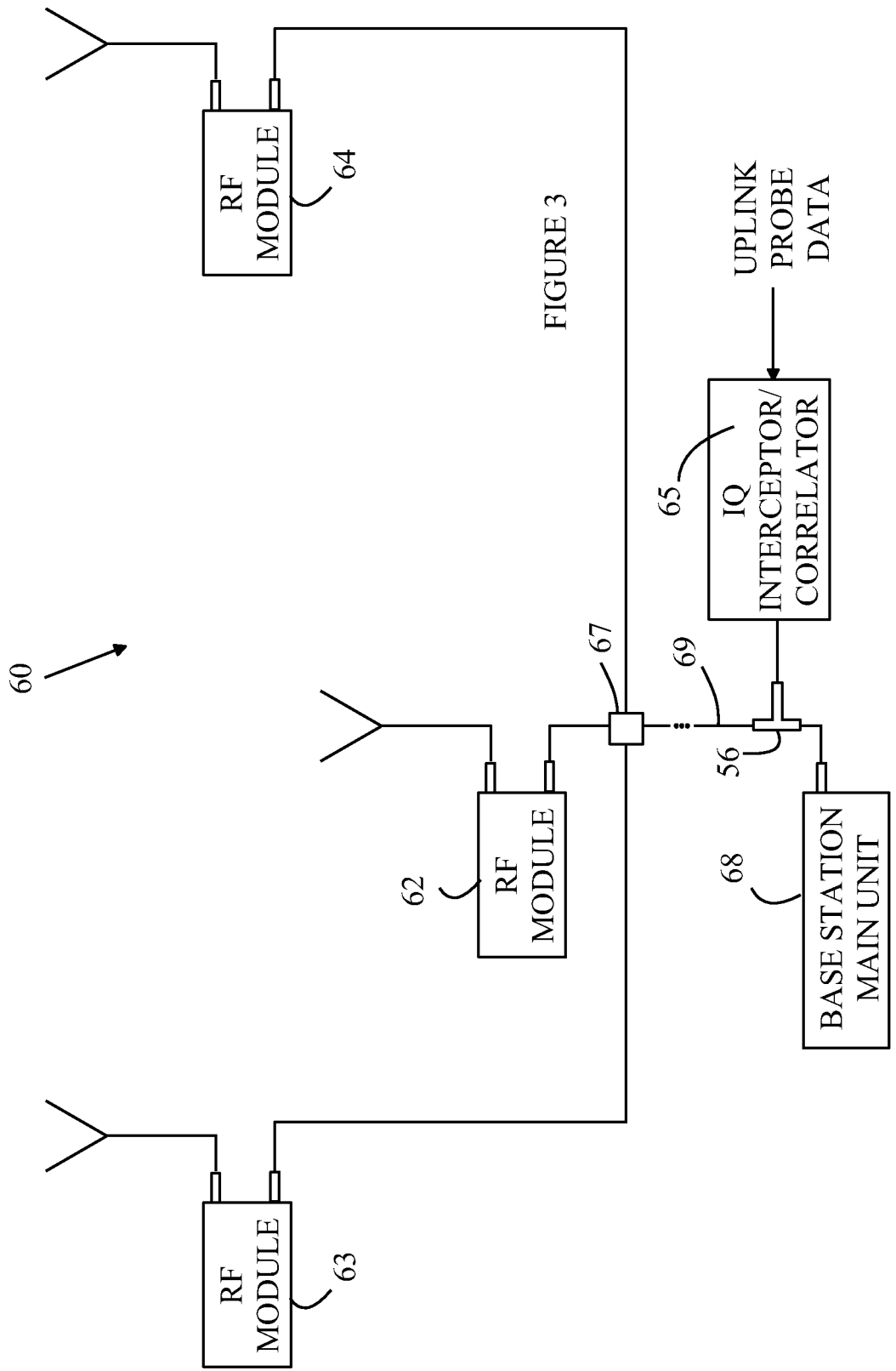
FIG. 3 illustrates a system in which a plurality of RF modules are serviced by a single base station main unit.

Configurations in which a plurality of RF modules are serviced by a single base station unit have also been proposed. In such systems, the frames to and from the various RF modules are time-division multiplexed on a common digital link. Refer now to FIG. 3, which illustrates a system in which a plurality of RF modules are serviced by a single base station main unit. In cellular system 60, RF modules 62-64 transmit and receive data from UEs in corresponding cells or parts of cells in the cellular system. The digital base-band signals that are transmitted by each RF module after frequency up-conversion or received by each RF module and sent to base station main unit 68 after frequency down-conversion are combined in a multiplexer 67. The signals from each RF module are typically time-division multiplexed. The frames transmitted on line 69 include identification of the RF module in question. Accordingly, IQIM 65 can demodulate the corresponding channels to obtain the UE identification data and scheduling data for any UE operating in any of the three cells. In addition, given this information, IQIM 65 can monitor the traffic to and from that UE.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. An apparatus comprising:
    a base-band input port that receives digital base-band communications comprising a plurality of communication channels utilized in communications between a Radio Equipment Control (REC) module and a Radio Equipment (RE) module that provides RF functions and interfaces with a plurality of UEs in a cellular network serviced by that RE module; and
    a processor that demodulates specific channels in said digital base-band communications and extracts therefrom information specifying:

a unique identity for each of said plurality of UEs and a temporary identification used for communicating with that UE, scheduling information identifying when one of said plurality of UEs is scheduled to upload information to said RE module and the communication channels over which said information is to be uploaded, wherein said processor does not demodulate others of said communication channels, wherein said apparatus is separate from said REC module, said RE module and said plurality of UEs and wherein said base-band input port receives said digital base-band communications prior to said RE module upconverting said digital base-band communications to an RF frequency for transmission to said plurality of UEs, extracting scheduling information identifying when one of said UEs is scheduled to download information, and demodulating information transmitted by one of said UEs without demodulating information transmitted by another of said UEs, wherein said demodulated information that is transmitted by said one of said UEs is determined from said scheduling information.

2. An apparatus comprising:

a base-band input port that receives digital base-band communications comprising a plurality of communication channels utilized in communications between a Radio Equipment Control (REC) module and a Radio Equipment (RE) module that provides RF functions and interfaces with a plurality of UEs in a cellular network serviced by that RE module; and a processor that demodulates specific channels in said digital base-band communications and extracts therefrom information specifying:

a unique identity for each of said UEs and a temporary identification used for communicating with that UE, scheduling information identifying when one of said UEs is scheduled to upload information to said RE module and the communication channels over which said information is to be uploaded, wherein said processor does not demodulate others of said communication channels, wherein said processor demodulates information that is to be sent to one of said UEs without demodulating information that is sent to another of said UEs, extracting scheduling information identifying when one of said UEs is scheduled to download information, and demodulating information transmitted by one of said UEs without demodulating information transmitted by another of said UEs, wherein said demodulated information that is transmitted by said one of said UEs is determined from said scheduling information.

3. The apparatus of claim 1 wherein said RE module is part of an LTE cellular communication system.

4. The apparatus of claim 3 wherein said scheduling information is obtained by decoding messages on a Physical Downlink Control Channel of said LTE cellular communication system.

5. The apparatus of claim 3 wherein said unique identity is obtained by decoding information on channels used by a UE to sign onto said LTE cellular communication system.

6. The apparatus of claim 1 wherein said RE module is connected to said REC module by a digital transmission link and wherein said apparatus further comprises a passive splitter that intercepts traffic on said digital transmission link.

7. The apparatus of claim 6 wherein said REC module services a plurality of RE modules on said digital transmission link and wherein said apparatus further determines an RE module associated with each communication on said digital transmission link.

8. A method for monitoring communications between an RE module in a cell of a cellular communication and UEs in that cell, said method comprising:

passively monitoring a digital link carrying digital base-band communications between an REC module and said RE module using an apparatus that is separate from said RE module, said REC module and said UEs, said digital base-hand communications being monitored prior to said RE module upconverting said digital base-band communications to an RF frequency for transmission to said UEs, wherein said digital base-band communications comprise communications in a 4G cellular network;

demodulating specific channels in said digital base-band communications and extracting therefrom information, wherein said specific channels comprise a Physical Downlink Control Channel, a Physical Downlink Shared Channel, and a Physical Uplink Shared Channel of said 4G cellular network, specifying:

a unique identity for each of said UEs and a temporary identification used for communicating with that UE, scheduling information identifying when one of said UEs is scheduled to upload information to said RE module and the communication channels over which said information is to be uploaded, wherein others of said communication channels are not demodulated, extracting scheduling information identifying when one of said UEs is scheduled to download information, and demodulating information transmitted by one of said UEs without demodulating information transmitted by another of said UEs, wherein said demodulated information that is transmitted by said one of said UEs is determined from said scheduling information.

9. The method of claim 8 wherein said digital base-band communications comprise a plurality of sub-carriers and wherein said demodulated channels comprise one of said sub-carriers, said one of said sub-carriers being determined by said scheduling information.

* * * * *